United States Patent [19]

Allegre et al.

[11] Patent Number: 5,720,035
[45] Date of Patent: Feb. 17, 1998

[54] SYSTEM FOR CONTROL OF ACCESS TO COMPUTER MACHINES WHICH ARE CONNECTED IN A PRIVATE NETWORK

[75] Inventors: François Allegre, Le Kremlin-Bicetre; Mireille Campana, Clamart; Jean-Michel Roy, Meudon-la-Foret, all of France

[73] Assignee: France Telecom, Paris, France

[21] Appl. No.: 560,963

[22] Filed: Nov. 20, 1995

[30] Foreign Application Priority Data

Nov. 21, 1994 [FR] France ................. 94 13899

[51] Int. Cl.⁶ .................................................. G06F 13/14
[52] U.S. Cl. .................. 395/200.06; 395/200.02; 395/200.12
[58] Field of Search ............... 395/200.06, 200.12, 395/200.02

[56] References Cited

U.S. PATENT DOCUMENTS 5,483,596  1/1996  Rosenow et al. ................. 380/25
5,550,984  8/1996  Gelb ............................ 395/200.17

FOREIGN PATENT DOCUMENTS 0 431 751  11/1990  European Pat. Off. .
0 554 182   1/1993  European Pat. Off. .
92 04790    9/1991  WIPO .

*Primary Examiner*—William M. Treat
*Attorney, Agent, or Firm*—Larson & Taylor

[57] ABSTRACT

A system for control of access by messages to computer machines which are connected in a host private network by at least one private terminal that comprises an access control module interconnected at each input-output point of the host private network, each module allowing the selective transmission by inhibition, free or conditional authorization of the transmission of the messages to the host private network. A centralized supervisor module is associated with the host private network and interconnected by a specialized link to each access control module, allowing thus to control the selective transmission of the messages by each access control module.

2 Claims, 4 Drawing Sheets

Dedicated link

FIG. 2b (Mas)

| Access control module number |
| Request identification number |
| Nature of the request (analysed, absent) |
| Copy of the frame |

FIG. 2c (Msar)

| Access control module number |
| Request identification number |
| Operation (destruction or disconnection) |
| Parameters |

FIG. 2d (Msac)

| Access control module number |
| Operation (addition, withdrawal) |
| Form observed |
| Mode applied (passing, blocking, modified) |
| Parameters (algorithms, keys....) |
| Duration of validity |

FIG.3a

FIG.3c (Maal)

| Field of responsibility |
|---|
| Algorithm used |
| Identity |
| Seal of all the other data |
| Cause |

FIG.3b (Msatp or Mtpas)

Supervisor or TP dialogue frame

| Security information: | Field of responsibility<br>Algorithm used |
|---|---|
| Access control module number | Role (Prover, verifier)<br>Identity |
| Copy of the "supervisor dialogue" frame | Control number<br>Seal of all the other data |
| Access uniqueness parameters: | Type (connection, revalidation)<br>Calling address<br>Called address<br>SAPs.... |
| Values negotiated: | Timer<br>Flow certification<br>Flow encryption |

FIG. 4a

FIG. 4b
NON-CONNECTED MODE

FIG. 4c
CONNECTED MODE

SYSTEM FOR CONTROL OF ACCESS TO COMPUTER MACHINES WHICH ARE CONNECTED IN A PRIVATE NETWORK

BACKGROUND OF THE INVENTION

The invention relates to system for control of access to computer machines which are connected in a private network.

At the present time, on many telecommunications networks, such as the INTERNET network for example, security, that is to say essentially control of access to a service, is provided either within the infrastructure of the network, for example by means of access lists guaranteed by the service operator, or within terminal machines connected to the network. The access control function generally makes it possible to limit access to machines which are authorized by the authority, and to record the connection, address, time or other parameters, so as to detect anomalies such as attempted intrusions.

In a general way, the security function is thus either transferred and distributed to the level of each machine, or provided by a dedicated entity, placed at the entry to the private network, in or downstream of the router, this entity managing security and its repercussions on the transfer of data.

However, in telephone networks, a distinction is made between the function of the communications transport and that of the management of this transfer and of the network. However, the management functionality does not concern the security functions.

In the present-day private telecommunications networks, the security function is carried out on the basis of elements of these networks making it possible essentially to establish access tables depending on the calling and called addresses pair. This security function is a minimum, but it is completely inadequate to confront the risks of address falsification. This is because, on many networks, the address of the calling machine is a declared value given by the caller, and it is thus easy for an unscrupulous owner of a machine connected to this network to change the address thereof for the purpose of acquiring undue access rights. Moreover, the access table is consulted for each data string transmitted for the communications in connected mode, which has the effect of greatly degrading the overall transmission performance.

Another drawback emerges from the fact that a private network may be accessible by several routers, the data flows transmitted being divided among them. Access tables therefore have to be established in a coherent way between each throughput point.

Finally, for the purpose of taking the notion of user into account, it is necessary to utilize resources of the network with a capacity for processing and for discernment which are not supplied by the routers.

In this context, it has been proposed, in order to prepare the security function, to use a special machine in series, according to the technique known as firewall technique. This solution is generally expensive in terms of performance, since it has to process all the incoming and outgoing data flows. This is because this technique involves verification of a certain number of criteria, so as to accept an access, and must allow routing of the data frames of the communications accepted. The finer the access analysis, having regard to the application requested, to the time, to a rigorous identification mode for example, the more the throughput performance is affected thereby. Moreover, the installation of a special machine in series presents a not inconsiderable risk with respect to the criterion of transmission reliability since, as it is located on the path of the traffic monitored, a breakdown or an error in this special machine is likely to block all traffic. The probability of such breakdowns or errors appearing is all the higher the more complex is the processing software carrying out the security function.

Finally, as the special machine is not dedicated, the abovementioned software being installed in it, the software is particularly complex, and it is very expensive to provide proof that no defect exists in the security function which would render the check ineffective.

It has also been proposed to carry out the security function by protecting all the machines connected to the network, access control being installed within each machine. This solution, which is very effective, is nevertheless very expensive, each machine having to be protected individually. The installation of this type of access control has therefore to be multiplied by the number of machines, which implies software parts of this access control being ported to each machine type and to each version of the operating system. Management of this access control, which is indispensable to take advantage of a high level of security, is made complex by the dispersion of the audit information, and changing and upgrading the abovementioned software parts is difficult to carry out, all the more so since, with the machines in which these software parts are installed not being dedicated, attention has to be paid to their integrity.

Finally, some machines which require high access security for configuring their routing table often do not have the power available to allow such software to be installed.

SUMMARY OF THE INVENTION

The object of the present invention is to remedy the abovementioned drawbacks, by implementing a system for control of access to computer machines which are connected in a private network.

A further subject of the present invention is the implementation of a system for control of access to computer machines which are connected in private networks, in which the data transport and access control members are physically separate.

A further object of the present invention, by virtue of the abovementioned separation, is to allow accessibility to the network at several points to be maintained, while reducing the size and the complexity of the software employed.

The system for control of access to computer machines which are connected in a private network, this network including one or more local networks interconnected by means of a router and of a switch and being connected to an interconnecting external network at input-output points allowing the exchange of information and/or of data in the form of successive messages, with at least one private terminal, the subject of the present invention, is noteworthy in that it comprises at least, combined in a private network, an access control module interconnected at each input-output point of the private network, designated by host private network, each access control module allowing the selective transmission, by inhibition, free or conditional authorization of the transmission of the said messages to the host private network. A centralized supervisor module, associated with the host private network, is interconnected by a dedicated link to each of the access control modules of the host private network, the centralized supervisor module making it possible to control the selective transmission of each of the access control modules upon request from the private terminal.

The system for control of access to computer machines which are connected in a private network, the subject of the present invention, finds an application in the field of remote information or data transmission.

BRIEF DESCRIPTION OF THE DRAWINGS

It will be better understood on reading the description and on perusing the drawings below, in which.

DETAILED DESCRIPTION OF THE INVENTION

A more detailed description of a system for control of access to computer machines which are connected in a private network, the subject of the present invention, will now be given in connection with FIG. 1.

In a general way, it is pointed out that the private network includes one or more local networks interconnected by means of a router, denoted R, and of a switch, denoted C. In the usual way, the private network may be connected to an interconnecting external network, denoted RF, at entry-exit points allowing the exchange of information and/or of data in the form of successive messages with either at least one private terminal, denoted TP, which can be interconnected to an access point, denoted B, of the interconnecting network RF, or to another private network, itself interconnected to the interconnecting network RF, as will be described later in the description.

Figure 1:
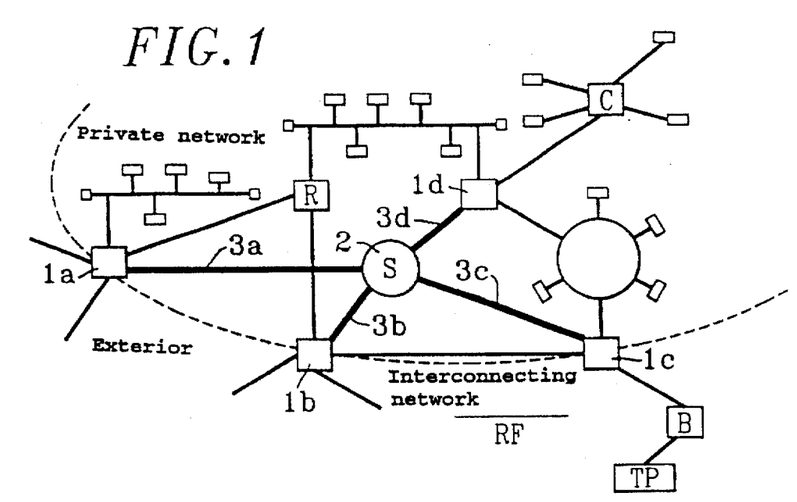
FIG. 1 represents a diagram illustrating the system for control of access to computer machines which are connected in a private network in accordance with the object of the present invention.

According to one particularly advantageous aspect of the system for control of access to computer machines which are connected in a private network, the subject of the invention, it comprises, as represented in FIG. 1, an access control module interconnected at each input-output point of the private network, the access control modules being denoted 1a to 1d in FIG. 1 and represented in a limited number so as not to overload the drawing. Each access control module allows selective transmission, by inhibition, free or conditional authorization of the transmission of messages to the private network, which is designated by host private network by reason of the equipping thereof by means of the access control system according to the invention.

Moreover, a centralized supervisor module 2 is provided, which is associated with the host private network and interconnected by a high-integrity dedicated link, denoted 3, to each of the access control modules 1a to 1d of the host private network. In FIG. 1, the dedicated link bears the reference 3 combined with the letter a, b, c or d designating, with the reference 1, each corresponding access control module. The centralized supervisor module 2 thus makes it possible to control the selective transmission of each of the access control modules 1a to 1d upon request from the private terminal TP or, as appropriate, from a distant machine connected to another private network, as will be described later in the description.

In the embodiment of the system for controlling access to computer machines connected in the private network, according to the invention, as represented in FIG. 1, it is understood that each access control module 1a to 1d has available only a restricted functionality but high communications capabilities, whereas the centralized supervisor module 2, in contrast, has available considerable processing and bulk memory resources, but lesser communications capabilities. It will be understood, in fact, that these communications capabilities are only those concerning the dedicated link linking the centralized supervisor module 2 to each of the access control modules 1a to 1d.

From a general point of view, it is pointed out that the access control modules 1a to 1d call, over the dedicated link 3, on the centralized supervisor module 2 for the important actions such as authorization for opening communications or introduction of a process of certification or of messages or of encipherment thereof, as will be described later in the description, or notify it of particular events such as the end of communication, a request for validation of a distant local network equipped with the same access control system.

The centralized supervisor module 2 records, in a bulk memory, the requests and notifications formulated either by the private terminal TP, or by a machine interconnected to another private network, as previously mentioned. These requests and notifications are transmitted by each access control module involved. Depending on the information available to the centralized supervisor module and on supplementary information which it may request by identification dialogue, either with the private terminal TP, or with a machine interconnected to another private network, the centralized supervisor module 2 is then in a position to alter the state of the access control module 1a to 1d involved in order to give it the authorization to transport the information or, on the contrary, to redirect the information flow transmitted by the interconnecting network RF, or even to cause a disconnection.

In a general way, it is pointed out that each access control module 1a to 1d may include a central calculating unit of the processor type, and a random-access memory in which access control programs can be stored and amended via the access control module 2 and each corresponding dedicated link.

Each access control module 1a to 1d takes the state indicated by the centralized supervisor module 2. When a message arrives in the form of a data frame, the transport units refer directly to the context of the current authorized connections, which are in random-access memory of each of the access control modules 1a to 1d.

Similarly, it is pointed out that the centralized supervisor module is a computer module including a central calculating unit combined with a random-access memory and, obviously, a bulk memory making it possible to store the state of the configurations of each access control module 1a to 1d.

Finally, in a simple embodiment, the dedicated link 3a to 3d may consist of a serial link, for example, so as to allow the transmission of a plurality of messages between centralized supervisor module 2 and private terminal, or other centralized supervisor module of another private network, as will be described below. In the case in which a private terminal TP is used, of the portable terminal type, it is then equipped with a specific module making it possible to generate, receive and interpret the abovementioned messages originating from the corresponding centralized supervisor module 2, to which a request for access to a computer machine of the private network has been formulated by the terminal TP.

An example of the information flows exchanged between every access control module, such as the modules 1a to 1d, and the centralized supervisor module 2, via a corresponding dedicated link 3, link 3a to 3d, will now be described in connection with FIGS. 2a to 2d, then 3a to 3c.

Figure 2A:
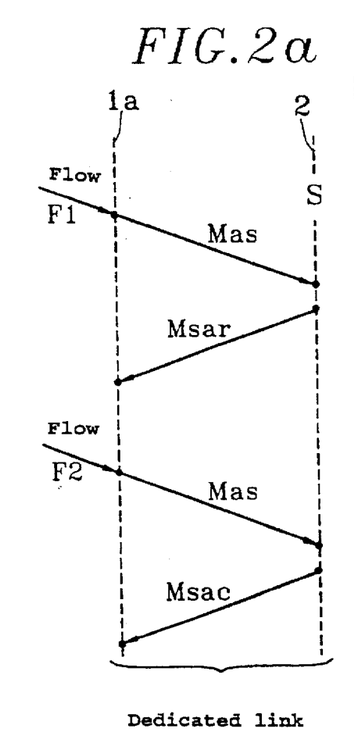
FIGS. 2a and 2b to 2d represent a diagram of a protocol for exchange of messages on the dedicated link of an access control system according to the invention, as represented in FIG. 1a, and the structure of these messages respectively.

In FIG. 2a, a protocol for the exchange of messages between the access control module, 1a for example, and the centralized supervisor module 2 of FIG. 1 has been represented, by way of example.

Figure 2B:
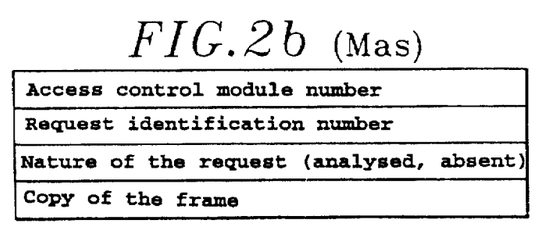

When the access control module 1a receives a flow F1 of data or of messages transmitted by the interconnecting network RF and not present in its table in through, blocking or modified mode, such a data flow being, in this case, considered to be unknown to the access control module 1a in question, the latter stores the messages constituting the abovementioned flow and transmits, on the dedicated link 3a to the centralized supervisor module 2, a message, denoted Mas, itself consisting of a frame, containing the information as represented in FIG. 2b. It is pointed out that the message Mas includes at least one address identification or reference number of the access control module 1a in question, an identification number of the request, this request identification number being allocated by the access control module 1a in question for the abovementioned data flow F1, a code making it possible to identify the nature of the request, this code possibly, in the simplest way, consisting of the value of a bit taking the value 1 when it has been possible to analyse the messages constituting the data flow F1 and, on the contrary, set to the value 0 when such a flow is not identified, that is to say when it is not present in the access table of the access control module 1a in question. Finally, each message Mas comprises a copy of the frame constituting the flow F1 received within the access control module 1a in question.

According to one particularly advantageous aspect of the access control system which is the subject of the present invention, the centralized supervisor module 2 responds explicitly to the abovementioned request only in the event of a refusal. In such a case, as represented in FIG. 2a, the centralized supervisor module 2 via the dedicated link 3a, sends the access control module 1a a message, denoted Msar, called refusal message, making it possible in fact to terminate the access request process for the data flow F1 in question.

Figure 2C:
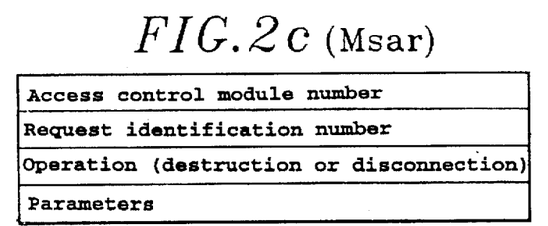

By way of non-limiting example, as represented in FIG. 2c, the message known as refusal message, Msar, may comprise the access control module number in question, the request identification number which is returned to the abovementioned access control module 1a, an operation instruction consisting in destroying the message constituting the data flow F1, or of causing disconnection of the abovementioned access control module 1a. Other parameters may be provided in the message Msar, as represented in FIG. 2c.

If, on the contrary, a data flow coming into the access control module in question, such as the module 1a, is accepted, this incoming data flow being denoted F2 in FIG. 2a, the acceptance of this incoming flow being carried out by the centralized supervisor module 2 following reception of the same message Mas for example, the abovementioned centralized supervisor module 2 reacts, on the contrary, by storing the access request in question and sends a configuration message, via the dedicated link 3a, to the access control module 1a in question. This configuration message is denoted Msac in FIG. 2a.

Figure 2D:
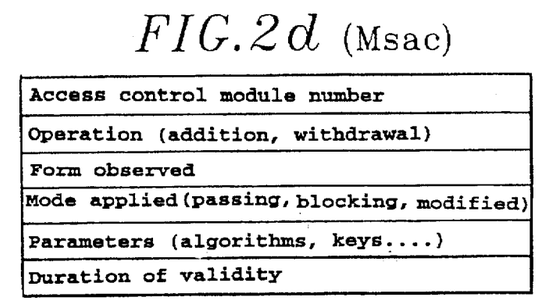

As represented by way of example in FIG. 2d, this configuration message may comprise the access control module number 1a in question, a code relating to the operation carried out to achieve this configuration, such an operation possibly consisting either in an addition or in a withdrawal of an access identifier, an observed-form code relating to the nature of the data flow F1 and, obviously, a field for the processing mode applied by the access control module 1a to the transmission of the data flow F2 towards its destination in the host private network, transmission to this destination being carried out by the router R for example. It will be understood, obviously, that this mode of processing the transmission designates, and specifies to the access control module 1a in question, either the selective transmission by inhibition, or the free or conditional authorization of the transmission of the messages of the data flow F2 to the abovementioned host private network.

Obviously, the configuration message Msac may also comprise a field relating to parameters constituting processing algorithms or keys for enciphering messages or for certification, as will be described later in the description, as well as a field relating to the duration of validity of the access which has just been granted.

When, for security purposes, access is granted by the centralized supervisor module 2 in analysed mode, this analysed mode making it possible to transmit data flows, such as the flows F2 for example, following a process of encipherment or of certification of the messages constituting these data flows, a dialogue of the interactive dialogue type is set up between the centralized supervisor module 2, represented in FIG. 1, and the private terminal TP or another supervisor module installed in another private network interconnected to the interconnecting network RF, as mentioned previously in the description. This interactive dialogue makes it possible, between the centralized supervisor module 2 and the private terminal TP or the centralized supervisor module, denoted S, of the other private network connected the interconnecting network RF, to specify the formalizing of the mode of encipherment or of certification of the messages exchanged. This interactive dialogue then allows the centralized supervisor module 2 to control the changing of the access table of the access control module in question, 1a for example, into the mode of conditional authorization of the transmission of the messages constituting the flow of incoming messages towards the host private network. The same is true of the centralized supervisor module S' installed in the other private network or for the private terminal TP.

Figure 3A:
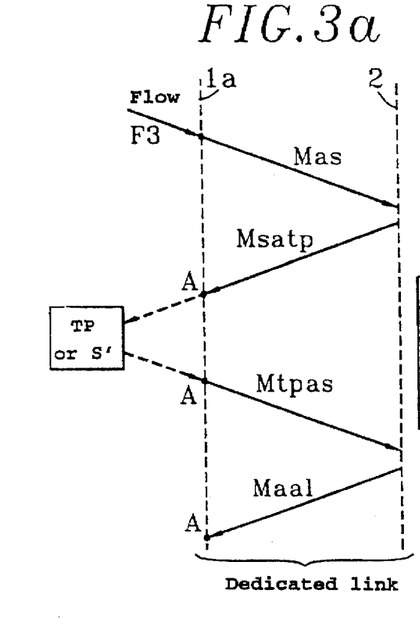
FIGS. 3a and 3b, 3c represent a diagram of a protocol for exchange of messages on the dedicated link of an access control system according to the invention, in the case in which it implements an encipherment or certification procedure.
Figure 3B:
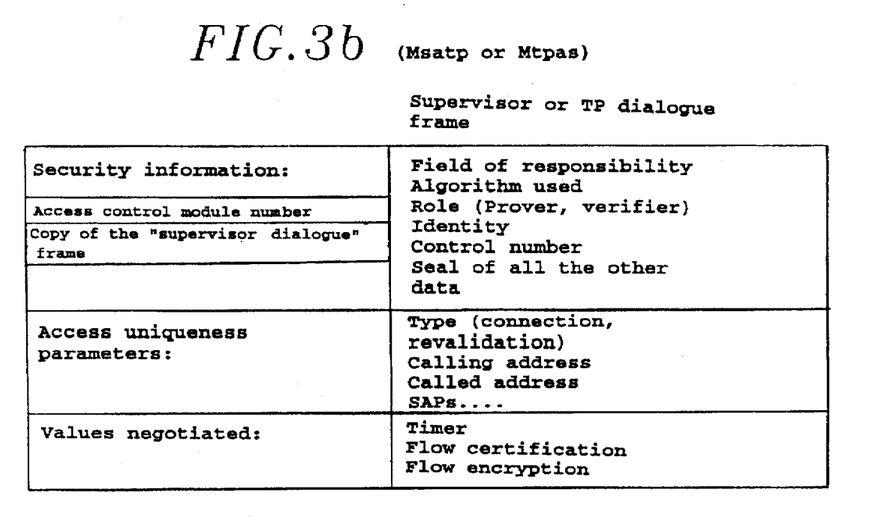

In such a case, it is pointed out that each centralized supervisor module transmits or receives an authentication dialogue frame, constituting an authentication message following reception of an access request from the access control module 1a, as represented in FIG. 3a. The centralized supervisor module 2 then sends the access control module 1a the authentication message, designated by Msatp, which is intended, via the dedicated link 3a, the access control module 1a and the interconnecting network RF, either for the private terminal TP, or for the supervisor S' of the other private network, as mentioned previously in the description. The message Msatp, as represented in FIG. 3b, comprises an access control module number, the access control module 1a in the example described here, as well as a field relating to the copy of the supervisor dialogue frame, which, as represented in the same FIG. 3b, may include a security information field including information relating to the field of responsibility, to the certification or encipherment algorithm used, to the role allocated to one or other of the centralized supervisor modules 2 or S', to the identity of the access requester, to the control number thereof and to a seal of all the other data. The supervisor dialogue frame may also include access uniqueness parameters relating to the type of connection or revalidation thereof, the address of the requester, that is to say either of the private terminal TP, or of a computer machine interconnected to the other specialized network managed by the centralized supervisor module S', the address of the machine interconnected to the private network in question managed by the centralized supervisor module 2, for example. Moroever, a negotiated-values field may be contained in the supervisor dialogue frame, these negotiated values possibly relating to a timer or time delay value, a value for certification of the flow and a value for encipherment of the flow.

It will be understood, as represented in FIG. 3a, that the interactive dialogue, by means of the messages Msatp or Mtpas between supervisors or supervisor and private terminal TP, is thus carried out via dedicated links and the interconnecting network, the transmission of authentication messages such as the Msatp or Mtpas messages being represented on the interconnecting network in dashes in FIG. 3a.

The interactive dialogue between the centralized supervisor module 2 and the corresponding centralized supervisor module S', or, if appropriate, the private terminal TP, takes place via a port number or NSAP, standing for "NETWORK SERVICE ACCESS POINT", allocated by the standardization authority of the interconnecting network RF. Each access control module, such as the module 1a, recognizes this attribute and routes all the abovementioned authentication messages to the supervisor in question, and normally sends the corresponding messages coming from the latter. Thus, via the set of authentication messages Msatp and Mtpas, the centralized supervisor module 2 requests either the private terminal TP, or the supervisor S', to confirm to it that it actually is the origin of the flow F3, represented in FIG. 3a, and asks it to prove the identity of the requester. The centralized supervisor module 2 or the private terminal TP, acting as tester, verifies the authenticity of the request made by the private terminal TP or by a machine interconnected to the other private network, equipped with the abovementioned supervisor S', and, by the authentication message Mtpas, sends a corresponding certified frame to the centralized supervisor module 2.

Figure 3C:
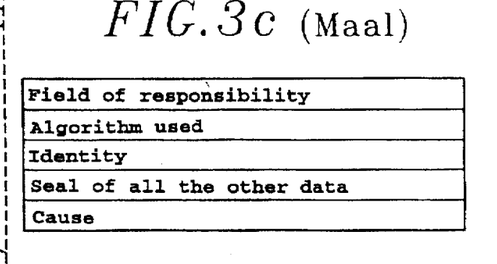

Moreover, the centralized supervisor modules 2 and S' can send alarm messages, denoted Maal and represented in FIG. 3a and 3c, these messages for example including a field relating to the field of responsibility, a field relating to the algorithm used, a field relating to the identity, a field relating to the seal of all the other data and to the reason for the alarm thus generated.

A more detailed description of a system for control of access to computer machines which are connected in a private network, in one specific embodiment in which the messages are transmitted according to an INTERNET protocol, will now be given in connection with FIG. 4a and FIGS. 4b and 4c.

The embodiment described here relates more particularly to the case in which an access control system, in accordance with the subject of the present invention, equips a first private network, bearing the reference E, this first private network obviously including a centralized supervisor module, denoted 2E, and a plurality of access control modules, which are denoted 1aE and 1bE so as not to overload the drawing. The network E is assumed to include a computer machine Y interconnected via access control modules 1aE and 1bE to the interconnecting network RF, the exchange and the transmission of messages on this network complying with the abovementioned INTERNET protocol.

Moreover, another private network, denoted network S, is also equipped with an access control system, in accordance with the subject of the present invention, this system, so as to simplify the description of the whole, being considered to contain a centralized supervisor module, denoted 2S, interconnected via a dedicated link 3 to one or more access control modules, denoted 1aS. A computer machine X is interconnected to the other private network S and, via the access control module 1aS, to the interconnecting network RF. The computer machine X is capable of sending out and of receiving messages via the interconnecting network F to another private network, such as the network E for example, more particularly to the machine Y thereof. Transmission and reception of the abovementioned messages obviously comply with the specifications of the INTERNET protocol.

Hence it is considered that the computer machine X or Y in fact constitutes the equivalent of a private terminal, interconnected to both the private networks respectively. Each of the private networks, and in particular the other private network, the network S, includes an access control module, such as the module 1aS interconnected at each entry-exit point of this private network, which thus constitutes another host private network. Each access control module of the latter allows selective transmission by inhibition, free or conditional authorization of the transmission of the messages to the host private network, the private network E.

Obviously, another centralized supervisor module, 2S, is associated with the private network S constituting the other host private network, this other supervisor module being interconnected via a dedicated link to each of the access control modules, such as the previously mentioned module 1aS. This centralized supervisor module makes it possible to control the selective transmission of each access control module associated with the other private network, the network S.

Obviously, the selective transmission of each of the access control modules, such as 1aE to 1bE and 1aS between private network and other private network E and S is subject to an interactive dialogue protocol between the supervisor module 2E associated with the private network E and the supervisor module 2S associated with the other private network S.

The interactive dialogue protocol makes it possible, depending on an access criterion and on identification information of the other private network S, within one of the access control modules of the host private network E, such as the access control module 1aE for example of the host private network, to inhibit the transmission of the messages between the private network and the other private network, or freely to allow the transmission of the messages between the other private network and the private network S and E respectively. It further makes it possible to authorize, conditionally on an operation of encipherment of the messages, the transmission of these messages in enciphered or certified form between the other private network, network S, and the private network, the network E.

Figure 4A:
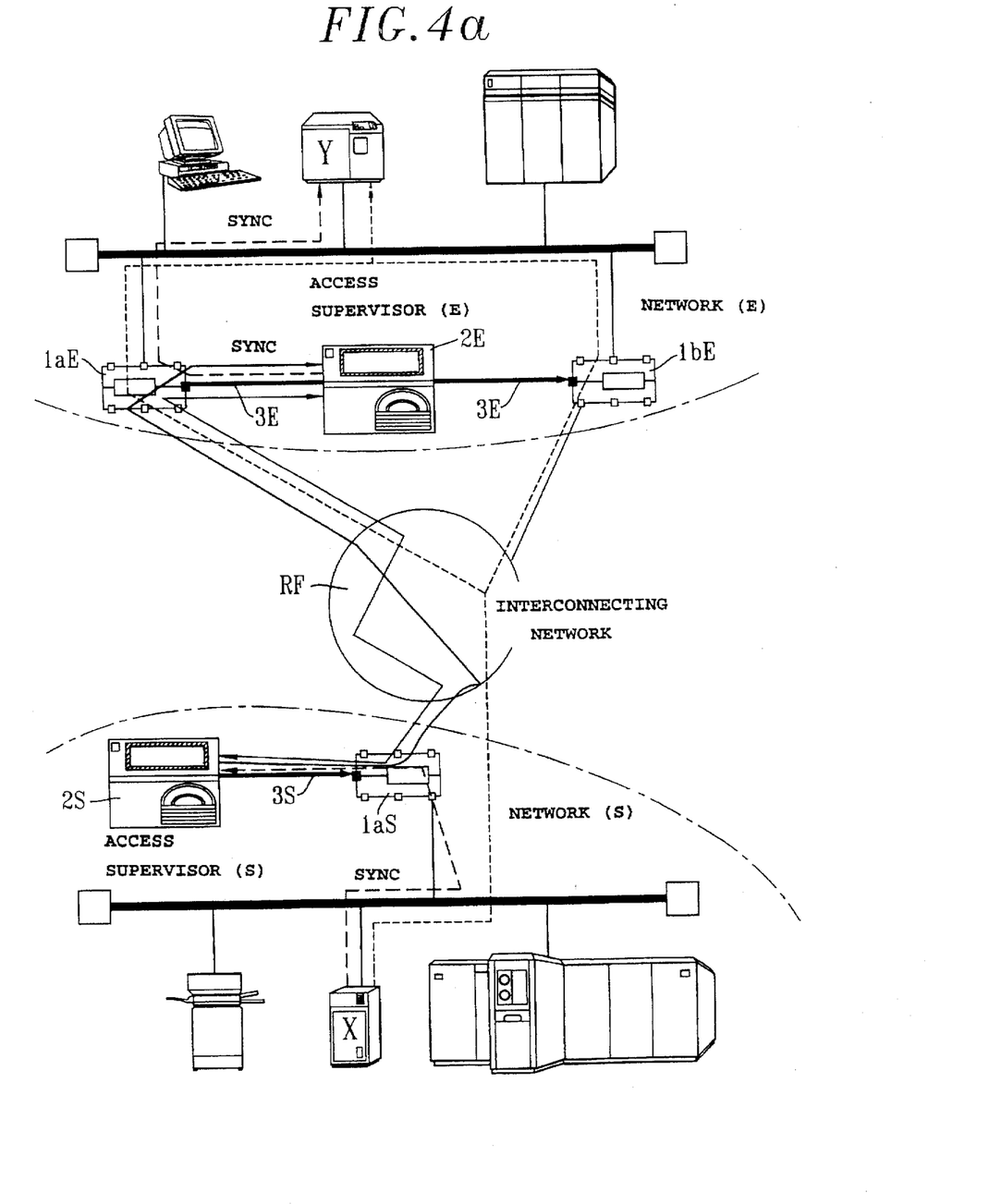
FIG. 4a represents a diagram illustrating the systems for control of access to computer machines which are connected in a private network in accordance with the subject of the present invention, in the case of two private networks joined by an interconnecting network, the intercommunication being achieved according to an INTERNET-type protocol.
Figure 4B:
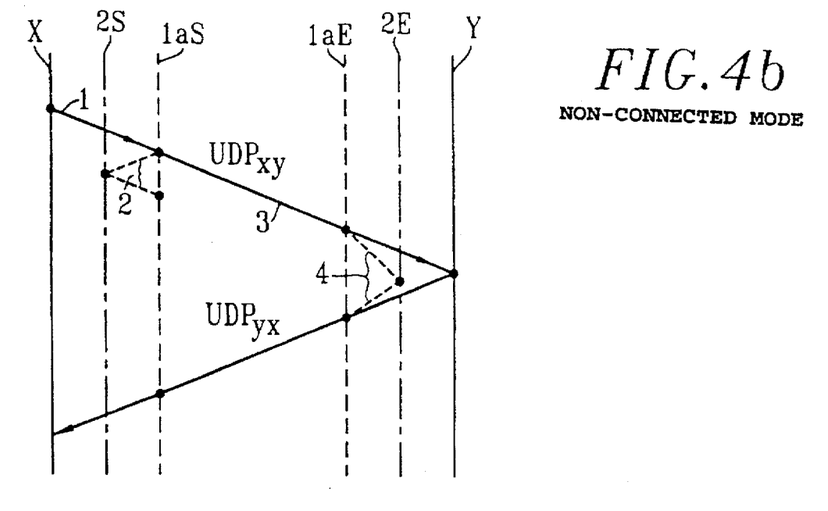

More specifically, as represented in FIGS. 4a and 4b, it is pointed out that the transport protocols complying with the INTERNET protocol may be distributed into two classes, a first class corresponding to the mode called non-connected, in which the messages transmitted are independent at the intercommunication level in question, and a second class called in connected mode, in which each layer successively manages the acquisition of the messages.

As has been represented in FIG. 4b relating to the non-connected mode, the computer machine X of the other private network S sends its messages consisting of frames UDP. The control module 1aS of the other private network S verifies, in its context, that is to say in the data constituting its access table, the mode of the communication at the exit. The operation of sending the UDP frames by the machine X to the access control module 1aS bears the reference 1 in FIG. 4b. If the communication request at the exit is not within the abovementioned context, the access control module 1aS, via the dedicated link 3S, asks the centralized supervisor module 2S whether it should add the communication requested into its context, that is to say into its access table, the communication requested being referenced by the addresses, the entry-exit port numbers, as previously described in connection with FIGS. 2a to 2d for example. Moreover, the request to the centralized supervisor module 2S also includes a request for transmission mode, through mode or blocking mode, as previously described in connection with the previously mentioned figures. The new state requested disappears from the allocation tables if no further traffic is provided on this communication for a time value which is set as a parameter, or upon an instruction from the abovementioned centralized supervisor module 2S, depending on management imperatives of the networks related to a change of time slot, for example. The centralized supervisor module 2S then records this request, for establishment or reestablishment of a UDP-type communication between the machines X and Y. In FIG. 4b, the message sent by the access control module 1aS to the centralized supervisor module 2S is represented in dashed lines and bears the reference 2. The frame $UDP_{xy}$ is transmitted by the access control module 1aS of the other private network S to the access control module 1aE of the private network E by the operation bearing the reference 3 via the interconnecting network RF.

Likewise, the access control module 1aE or, as appropriate, the access control module 1bE, according to the availabilities of the interconnecting network RF, upon reception of the frame $UDP_{xy}$, sends a request message to the centralized supervisor module 2E, which will, under the conditions previously mentioned in the description, freely or conditionally authorize, or refuse, this communication. This operation bears the reference 4 in FIG. 4b. In the event that the machine Y is authorized to respond, the response authorization being situated in the context, that is to say in the access table of the access control module 1aE or 1bE, either in advance, or following the abovementioned operation 4, the authorization having been granted by this operation by the centralized supervisor module 2E, the access control module 1aE with the communication authorization present in its access table, allows the transmission of a frame $UDP_{yx}$ to the access control module 1aS via the interconnecting network RF and finally via the abovementioned access control module 1aS to the machine X.

Figure 4C:
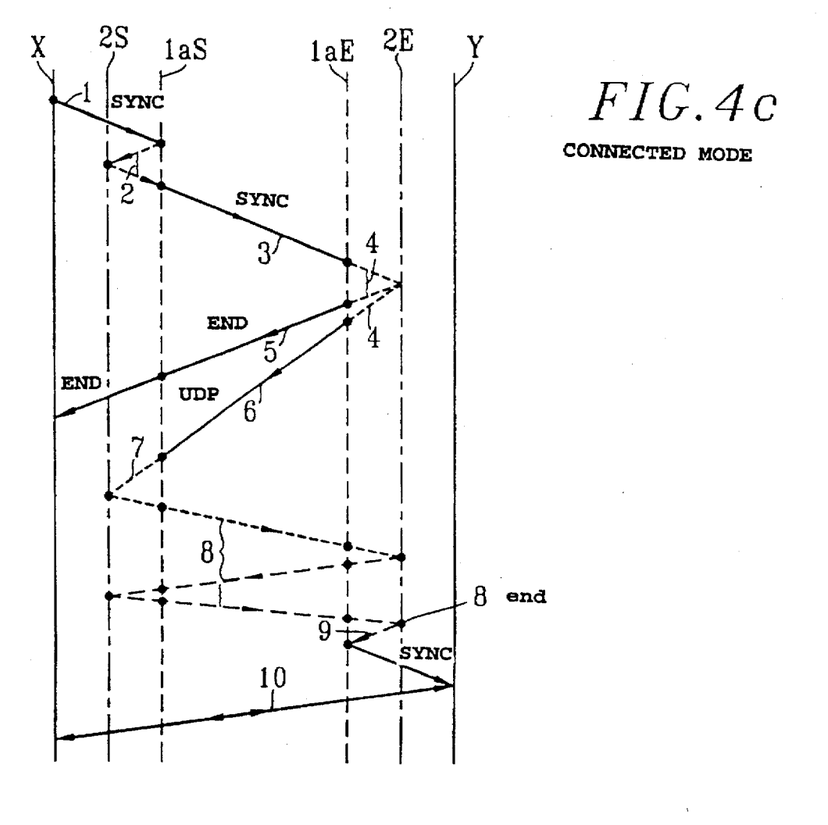

In the case of the connected mode, on the contrary, as represented in FIG. 4c, in order to open the connection, the machine X of the other private network S sends a specific frame TCP, this frame being denoted SYNC in FIG. 4c in question. The access control module 1aS, upon reception of the abovementioned specific frame TCP, sends this opening request over the dedicated link 3 to the centralized supervisor module 2S. The centralized supervisor module 2S consults its access tables so as to authorize, or not authorize, the transmission by the machine X of messages to the private network E with the request for services demanded. The centralized supervisor module 2S records this request and holds it in buffer memory by virtue of the memory storage of address parameters of the machines X and Y, of the frame TCP and of the corresponding entry-exit ports, this information being kept in memory, either awaiting a request for verification from a distant machine, the machine Y, or until expiry of a time delay. Upon the authorization delivered by the centralized supervisor module 2S at the end of the operation 2 represented in FIG. 4c, the specific signal TCP, denoted SYNC, is transmitted by the access control module 1aS, at operation 3, via the interconnecting network RF, which routes it to the private network E. The access control module 1aE or 1bE then receives the abovementioned specific frame TCP, consisting of the SYNC signal, and, after storing this signal in memory, asks the centralized supervisor module 2E, by operation 4, for the instructions for transmitting the request under the conditions previously mentioned in the description. The centralized supervisor module 2E records this input request then, depending on the access rules available in the latter's access table, decides:

either to refuse the communication, the abovementioned access control module 1aE in this case, as represented in FIG. 4c, receiving notification by means of an end-frame, END, the access control module 1aE transmitting a message END for breaking off the connection, at operation 5;

or to accept carrying on transmission of the messages, without additional check;

or alternatively to send the computer machine X of the other private network a UDP-type frame on a specific port, as represented by operation 6 in FIG. 4c. The access control module 1aS sends the specific frame UDP to the centralized supervisor module 2S by the operation referenced 7. The latter checks that it can respond to the centralized supervisor module 2E and that the communication being checked actually is at the instigation of a machine of its network, a machine of the other private network S and, in particular, the abovementioned machine X. A dialogue of the interactive dialogue type is set up between the two centralized supervisor modules 2E and 2S by operation 8, which is represented in dashes in FIG. 4c, this interactive dialogue being, obviously, for the purpose of affording the proof of the assertions formulated in the requests from the machines X and Y. When this verification is completed, that is to say at the end of stage 8 shown symbolically by the reference $8_{END}$ in FIG. 4c, the centralized supervisor module 2E sends an authorization message to the access control module 1aE, as represented at operation 9, the access control module 1aE setting itself to through, free or controlled mode, and then sending the SYNC message previously stored in memory at the end of stage 3 to the machine Y of the private network E.

The machines X and Y can then communicate by a stage 10 consisting in reciprocal exchanges of messages, this stage of message exchanges being shown symbolically by the reversed arrows indicating the alternate transmission in one or other direction of messages between the machines X and Y. The access control modules 1aS and 1aE remain, obviously, in through mode as long as there is no absence of data flow exceeding a time of defined duration and chosen by means of timers.

If part of the data flow is routed by the interconnecting network RF to the access control module 1bE of the private network E, for reasons relating only to the management of the interconnecting network, the access control module 1bE carries out the transmission process as previously described at steps 4, 6, 7, and 8 relative to the access control module 1aE, and the centralized supervisor module 2E sends its agreement under similar conditions by simple duplication of the message, held in memory, of the acceptance given to the access control module 1aE.

Hence a system has been described for control of access to computer machines which are connected in a private network, of particularly high performance given that, in contrast to routers with an access list, the system which is the subject of the present invention makes it possible to introduce more access modes than the latter, which are on different intercommunication layers.

Thus, in through mode, the information flow for a pair of calling/called machines is transported without any constraint, in blocking mode, the flow is not transmitted;

in enabled mode, the flows in connected mode are validated by authentication upon opening, the flow becoming through flow or blocking after this validation, and the non-connected flow being capable of being certified or encrypted by using a time-dependent enciphering key;

in modified mode, in which one parameter of the communication is changed during its communication, the internal address for example, or certification or encipherment capable of being applied to the frame or message transmitted;

in analysed mode, the data flow is temporarily redirected to the supervisor so that the latter can carry out finer analysis of the flow of data transmitted, the centralized supervisor module being capable of setting a transmission mode on a flow related to the same communication.

The conditions of application of the abovementioned operating modes are also more flexible than those of the systems of the prior art, since they can be made dependent on the time, on the day, on the week, for example.

Moreover, the number of communications accesses to be monitored in connected mode has practically no influence on the data flow transmitted. In fact, each access control module requests notification from the centralized supervisor module to which it is connected only for the frames forming the opening or the closing of a transmitted data flow, the frames or messages which make up the transmitted data flow of validated communications passing normally in a transparent way.

Moreover, in the case in which the access control system which is the subject of the present invention occupies a private network and another originator and destination private network, it is possible to encipher or to certify the data transmitted after undertaking an enciphering process between the two centralized supervisor modules, and distribution of the enciphering key corresponding to the transport elements. The access control system, the subject of the present invention, makes it possible not to limit the enciphered or certified flow to a single passage point.

We claim:

1. A system for control of access to computer machines which are connected in a private network, said private network including one or more local networks interconnected by means of a router and of a switch, said private network being connected to an interconnecting external network RF at input-output points allowing the exchange of information together with data in the form of successive messages, with at least one private terminal, and said at least one private terminal being interconnected to another private network, wherein said access control system includes, combined with said private network:

an access control module interconnected at each input-output point of said private network, designated by host private network, each access control module allowing the selective transmission, by inhibition, free or conditional authorization of the transmission of said messages to said host private network;

a centralized supervisor module, associated with said host private network and interconnected by a dedicated link to each of the access control modules of said host private network, said centralized supervisor module controlling said selective transmission of each of the access control modules, upon request from said at least one private terminal, said system further including, associated with said another private network:

an access control module interconnected at each input-output point of said another private network, constituting another host private network, each access control module allowing the selective transmission, by inhibition, free or conditional authorization of the transmission of said messages to said host private network;

another centralized supervisor module which is associated with said another host private network and interconnected by a dedicated link to each of the access control modules of said another host private network, said another centralized supervisor module controlling said selective transmission of each access control module associated with said another private network, said selective transmission of each of the access control modules between said private network and said another private network being subject to an interactive dialogue protocol between the supervisor module associated with said private network and the supervisor module associated with said another private network, said interactive dialogue protocol providing, depending on an access criterion and on identification information of said another private network, within at least one access control module of said host private network:

either to inhibit the transmission of said messages between said another private network and said private network;

or freely to authorize transmission of said messages between said another private network and said private network;

or, conditional on an operation of enciphering said messages, to authorize transmission of said messages in encrypted or certified form between said another private network and said private network.

2. The access control system of claim 1, wehrein said private terminal includes an access control module controlled by said centralized supervisor module associated with said private network.

* * * * *